R. L. BAILEY.
CRANK SHAFT.
APPLICATION FILED NOV. 24, 1919.
1,420,905.
Patented June 27, 1922.
2 SHEETS—SHEET 1.
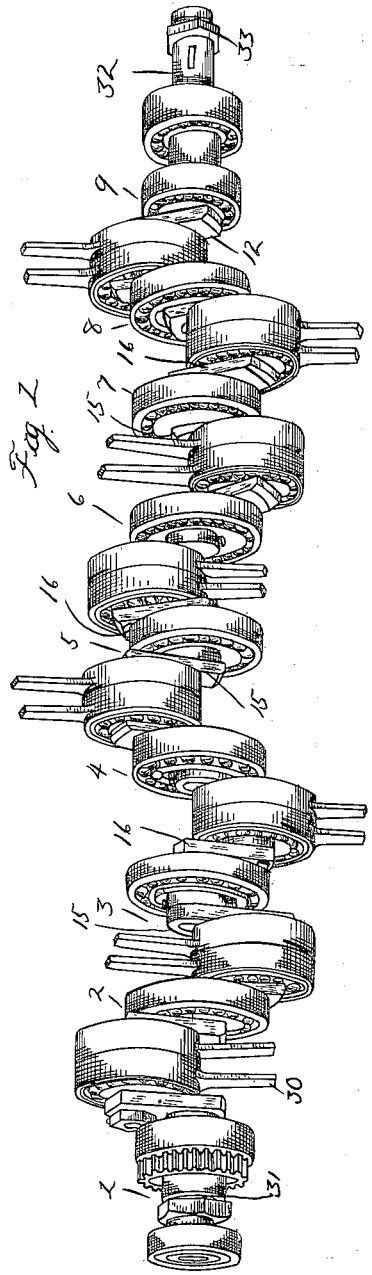
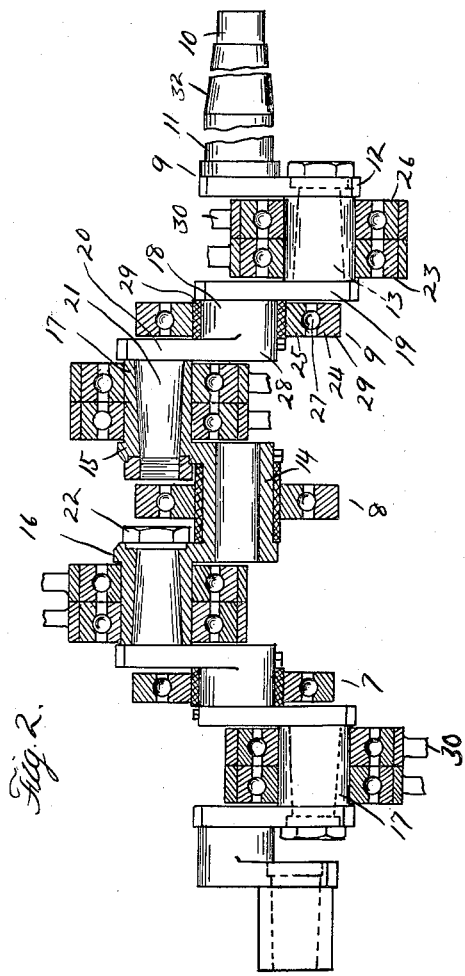
Inventor
Robert L. Bailey
By Whittemore Hulbert & Whittemore
Attorneys

R. L. BAILEY.
CRANK SHAFT.
APPLICATION FILED NOV. 24, 1919.

1,420,905.

Patented June 27, 1922.
2 SHEETS—SHEET 2.

Inventor
Robert L. Bailey ns.

UNITED STATES PATENT OFFICE.

ROBERT L. BAILEY, OF DETROIT, MICHIGAN.

CRANK SHAFT.

1,420,905.

Specification of Letters Patent. Patented June 27, 1922.

Application filed November 24, 1919. Serial No. 340,189.

*To all whom it may concern:*

Be it known that I, ROBERT L. BAILEY, a citizen of the United States of America, residing at Detroit, in the county of Wayne and State of Michigan, have invented certain new and useful Improvements in Crank Shafts, of which the following is a specification, reference being had therein to the accompanying drawings.

The invention relates to crank shafts and has for its object the provision of a crank shaft comprising a plurality of sections secured to each other, each section having a main bearing portion. Another object is the provision of anti-friction bearings engageable with the main bearings and crank pins of the crank shaft. Other objects of the invention reside in the novel arrangements and combinations of parts as more fully hereinafter set forth.

In the drawings:

Figure 1 is a perspective view of a construction embodying my invention;

Figure 2 is a side view, partly in section, thereof;

Figure 3:
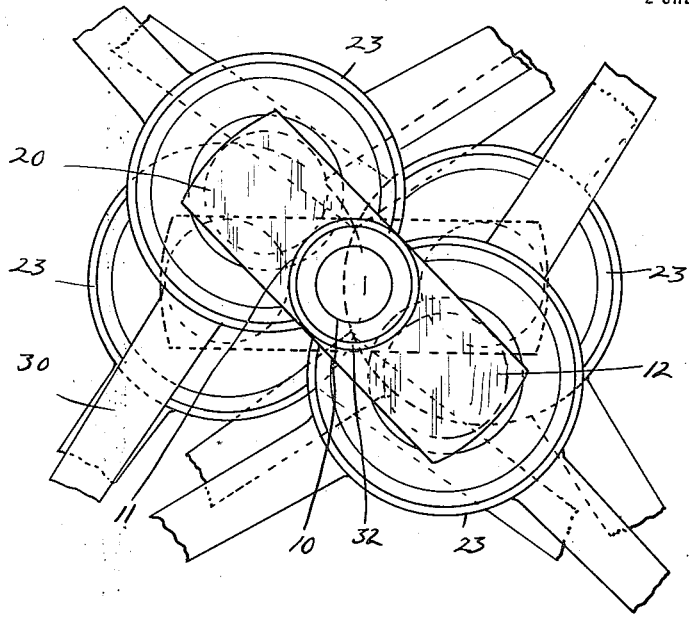
Figure 3 is an end view thereof.
Figure 4:
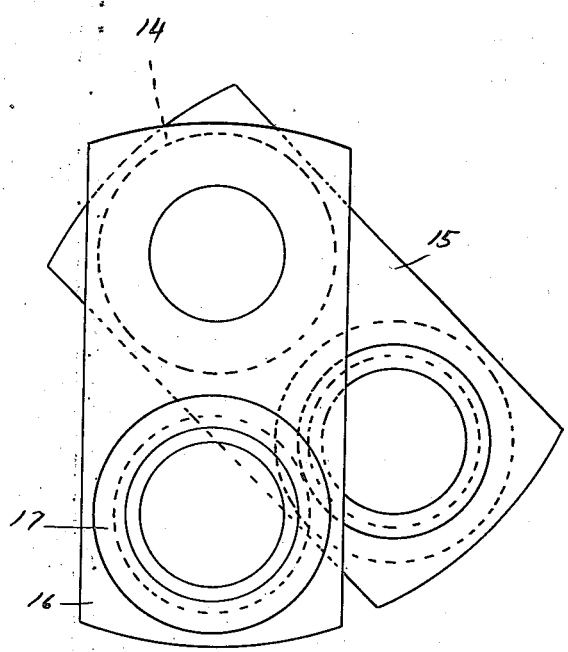
Figure 4 is an end view of the middle section.

The crank shaft comprises the sections 1, 2, 3, 4, 5, 6, 7, 8 and 9. The sections 1 and 9 are respectively rear and front end sections, each of which has the main bearing portions 10 and 11, the radially-extending arm 12 and the outwardly-extending cylindrical crank pin 13 at the end of the arm. The sections 3, 5 and 7 are U-shaped and each has the main bearing portion 14, the radially-extending arms 15 and 16, and the outwardly-extending cylindrical crank pins 17. The axes of the arms 15 and 16 of the sections 3 and 7 are parallel while the axes of the arms 15 and 16 of the section 5, (the middle section of the crank shaft) diverge at an angle of 45° from the axis of the main bearing portion 14.

Intermediate the sections 1, 3, 5, 7 and 9 are the sections 2, 4, 6 and 8, which are alike. Each of these sections comprises the main bearing portion 18, the oppositely-extending radial arms 19 and 20 and the outwardly-extending pins 21 at the ends of the arms. These pins are tapered and engageable in correspondingly tapered apertures in the cylindrical crank pins 13 and 17, nuts 22 threadedly engaging the outer ends of the pins to clamp the sections together.

The main bearings are all concentric with the axis of the crank shaft while the axes of the cylindrical crank pins are equally spaced from the crank-shaft axis.

With the construction as thus far described it will be seen that there is a main bearing portion adjacent to each arm of a throw and that the only stresses to which the nuts 22 are subjected are those due to end thrust. Due to the fact that the crank shaft is made up in sections the cost of manufacture is greatly decreased since the sections can be made standard, since no appreciable amount of material is wasted, and since no special and expensive machines are necessary.

Another important feature of my invention is that the crank pins 13 and 17 and the main bearing portions 14 and 18 are respectively provided with the anti-friction bearings 23 and 24. These anti-friction bearings comprise the inner and outer races 25 and 26 respectively and the series of balls 27 therebetween. The ball bearings 23 are slidably fitted to the crank pins before the assembly of the sections; while the ball bearings 24 are also mounted upon the main bearing portions before the assembly of the sections. In the latter case the inner diameter of the inner race 25 is sufficiently large to permit of passing the same over either the throw 15 or 20, the inner end 28 of which terminates in a semi-circular surface in continuation of the surface of the main bearing portion. After the ball bearing is placed to surround the main bearing a half section of the bushing 29 is inserted over the inner end of the arm and between the main bearing portion and the inner race. This half section is then rotated about the main bearing portion through an angle of approximately 180° and the other half section is similarly inserted.

Piston rods 30 are suitably connected to the outer races 26 of the anti-friction bearings 23.

The main bearing portions 10 and 11 of the end sections 1 and 9 are also provided with anti-friction bearings similar to those described above, and these have a sliding fit. The rear end section 1 has the conical portion 31 intermediate the main bearing portions 10 and 11 for engagement with a gear which is preferably keyed thereto; while the front end section 9 has the conical portion 32 forward of the main bearing portions for engagement with a propeller which is non-rotatably secured by means of the nut 33 and a suitable key.

What I claim as my invention is:

1. In a crank shaft, the combination of a plurality of sections, each comprising a main bearing portion and an arm, and a U-shaped section intermediate said sections and having a main bearing portion and a pair of radially extending arms arranged at different angles from the axis of its main bearing portion.

2. In a crank shaft, the combination of end sections each having a main bearing portion and a radial arm, sections adjacent to said end sections and each having a main bearing portion and oppositely-extending radial arms, and a U-shaped section between said second-mentioned sections and having a main bearing portion and a pair of radially extending arms.

3. In a crank shaft, the combination with a plurality of sections each comprising a main bearing portion and an arm, of a U-shaped section intermediate said sections and having a main bearing portion and a pair of arms.

4. In a crank shaft, the combination of end sections each having a main bearing portion and a radial arm, U-shaped sections each having a main bearing portion and a pair of radial arms, and a third series of sections between said end sections and U-shaped section and also between said U-shaped sections, each of said third series of sections having a main bearing portion and a pair of oppositely extending radial arms.

5. In a crank shaft, the combination of end sections each having a main bearing portion and a radial arm, U-shaped sections each having a main bearing portion and a pair of radial arms, and a third series of sections between said end sections and U-shaped sections and also between said U-shaped sections, each of said third series of sections having a main bearing portion and a pair of oppositely extending radial arms, one of said U-shaped sections having its radial arms arranged at different angles from the axis of its main bearing portion.

In testimony whereof I affix my signature.

ROBERT L. BAILEY.